United States Patent
Handy

(10) Patent No.: US 6,438,889 B1
(45) Date of Patent: Aug. 27, 2002

(54) FISHING ROD SUPPORT APPARATUS

(76) Inventor: Thomas A. Handy, 15141 S. Maple Lane Rd., Oregon City, OR (US) 97045

( * ) Notice: Subject to any disclaimer, the term of this patent is extended or adjusted under 35 U.S.C. 154(b) by 0 days.

(21) Appl. No.: 09/779,997

(22) Filed: Feb. 9, 2001

(51) Int. Cl.[7] ................................................ A01K 97/10
(52) U.S. Cl. ........................ 43/21.2; 248/166; 248/171; 248/514
(58) Field of Search ............................ 43/21.2; 248/511, 248/514, 515, 519, 520, 528, 529, 163.1, 166, 168–171, 188.2

(56) References Cited

U.S. PATENT DOCUMENTS

| | | | | |
|---|---|---|---|---|
| 714,043 A | * | 11/1902 | Seitz | 248/170 |
| 730,026 A | | 6/1903 | Widmer | |
| 2,283,092 A | * | 5/1942 | Rosen | 248/514 |
| 2,438,388 A | * | 3/1948 | Dolk | 43/21.2 |
| 2,586,149 A | * | 2/1952 | Coble | 248/169 |
| 2,763,453 A | * | 9/1956 | Palino | 248/514 |
| 3,180,602 A | * | 4/1965 | Monell | 248/170 |
| 4,043,070 A | * | 8/1977 | Lamothe | 43/21.2 |
| 4,096,662 A | * | 6/1978 | Anderson | 248/170 |
| 4,177,595 A | * | 12/1979 | Chon | 43/21.2 |
| 4,236,339 A | * | 12/1980 | White | 43/21.2 |
| 4,832,296 A | * | 5/1989 | Schnepp | 248/168 |
| 4,915,332 A | * | 4/1990 | Ouellette | 248/171 |
| 4,988,064 A | * | 1/1991 | Hoshino | 248/170 |
| 5,137,236 A | * | 8/1992 | Burns | 248/171 |
| D335,889 S | * | 5/1993 | Gibran | 15/22.1 |
| 5,354,024 A | * | 10/1994 | Vinghog et al. | 248/166 |
| 5,367,815 A | * | 11/1994 | Liou | 43/21.2 |
| 5,400,996 A | * | 3/1995 | Drish | 248/171 |
| 6,173,928 B1 | * | 1/2001 | Coats | 248/171 |
| 6,173,929 B1 | * | 1/2001 | LaPointe | 248/170 |

FOREIGN PATENT DOCUMENTS

| | | | |
|---|---|---|---|
| FR | 2676330 B1 | * | 11/1992 |
| JP | 10-84833 B1 | * | 4/1998 |

* cited by examiner

*Primary Examiner*—Darren W. Ark

(57) ABSTRACT

A fishing rod support apparatus for supporting and pivotally adjusting a fishing-pole. The fishing rod support apparatus includes a shaft that has a pair of ends and a stand assembly for supporting the shaft above a surface. The stand assembly preferably comprises an annular collar that is removably mounted about a peripheral wall of the shaft. A plurality of leg members each having a first end and a second end is coupled to an outer surface of the annular collar. A tubular member for selectively receiving a handle of a fishing pole is coupled to the first end of the shaft.

14 Claims, 4 Drawing Sheets

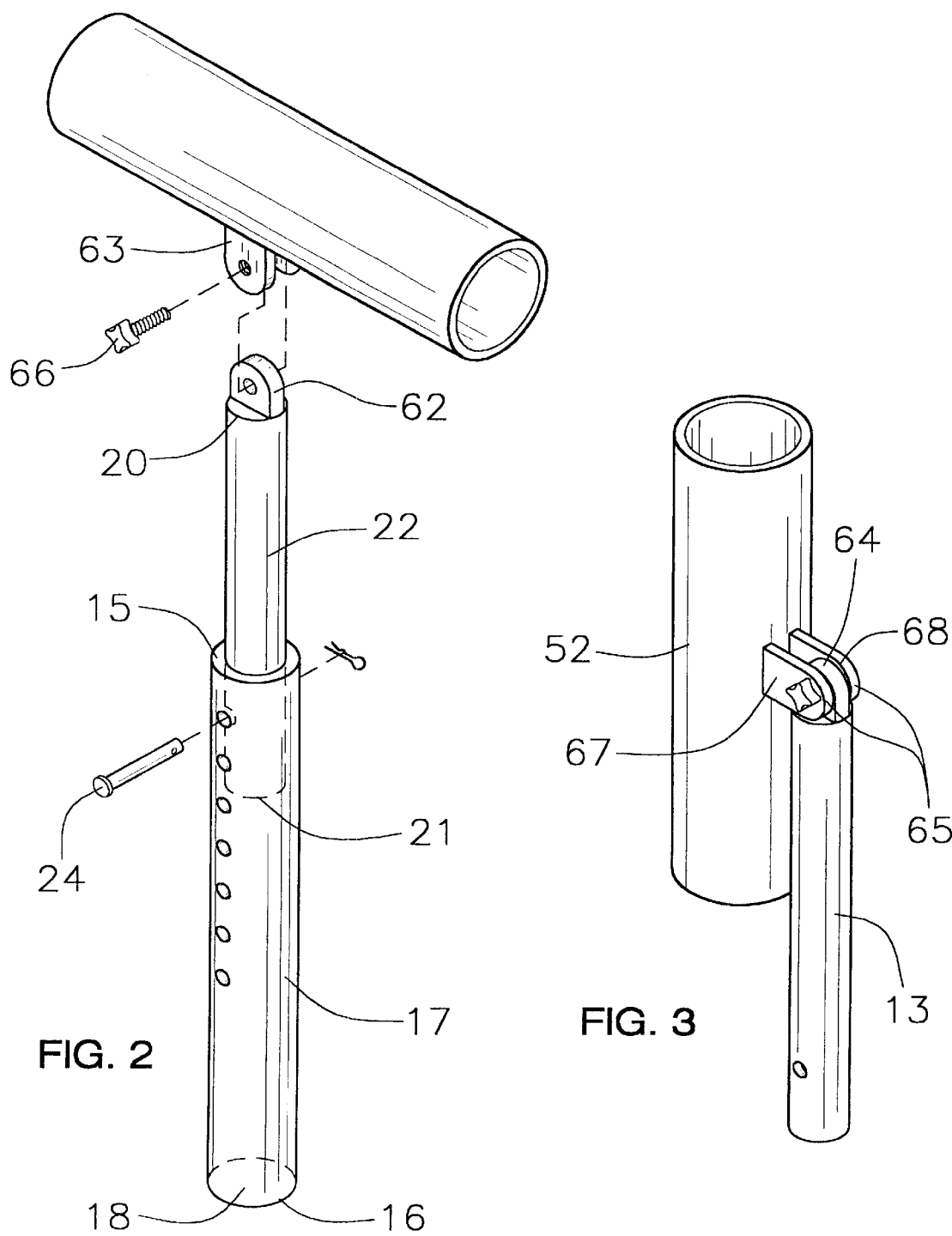

FISHING ROD SUPPORT APPARATUS

BACKGROUND OF THE INVENTION

1. Field of the Invention

The present invention relates to fishing rod supports and more particularly pertains to a new fishing rod support apparatus for supporting and pivotally adjusting a fishing pole.

2. Description of the Prior Art

The use of fishing rod supports is known in the prior art. More specifically, fishing rod supports heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,177,595; U.S. Pat. No. 5,367,815; U.S. Pat. No. 5,137,236; U.S. Pat. No. 714,043; and U.S. Pat. No. Des. 335,889.

While these devices fulfill their respective, particular objectives and requirements, the aforementioned patents do not disclose a new fishing rod support apparatus. The inventive device includes a shaft that has a pair of ends and a stand assembly for supporting the shaft above a surface. The stand assembly preferably comprises an annular collar that is removably mounted about a peripheral wall of the shaft. A plurality of leg members each having a first end and a second end is coupled to an outer surface of the annular collar. A tubular member for selectively receiving a handle of a fishing pole is coupled to the first end of the shaft.

In these respects, the fishing rod support apparatus according to the present invention substantially departs from the conventional concepts and designs of the prior art, and in so doing provides an apparatus primarily developed for thee purpose of supporting and pivotally adjusting a fishing pole.

SUMMARY OF THE INVENTION

In view of the foregoing disadvantages inherent in the known types of fishing rod supports now present in the prior art, the present invention provides a new fishing rod support apparatus construction wherein the same can be utilized for supporting and pivotally adjusting a fishing pole.

The general purpose of the present invention, which will be described subsequently in greater detail, is to provide a new fishing rod support apparatus apparatus and method which has many of the advantages of the fishing rod supports mentioned heretofore and many novel features that result in a new fishing rod support apparatus which is not anticipated, rendered obvious, suggested, or even implied by any of the prior art fishing rod supports, either alone or in any combination thereof.

To attain this, the present invention generally comprises a shaft that has a pair of ends and a stand assembly for supporting the shaft above a surface. The stand assembly preferably comprises an annular collar that is removably mounted about a peripheral wall of the shaft. A plurality of leg members each having a first end and a second end is coupled to an outer surface of the annular collar. A tubular member for selectively receiving a handle of a fishing pole is coupled to the first end of the shaft.

There has thus been outlined, rather broadly, the more important features of the invention in order that the detailed description thereof that follows may be better understood, and in order that he present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object-of the present invention to provide a new fishing rod support apparatus apparatus and method which has many of the advantages of the fishing rod supports mentioned heretofore and many novel features that result in a new fishing rod support apparatus which is not anticipated, rendered obvious, suggested, or even implied by any of the prior art fishing rod supports, either alone or in any combination thereof.

It is another object of the present invention to provide a new fishing rod support apparatus which may be easily and efficiently manufactured and marketed.

It is a further object of the present invention to provide a new fishing rod support apparatus which is of a durable and reliable construction.

An even further object of the present invention is to provide a new fishing rod support apparatus which is susceptible of a low cost of manufacture with regard to both materials and labor, and which accordingly is then susceptible of low prices of sale to the consuming public, thereby making such fishing rod support apparatus economically available to the buying public.

Still yet another object of the present invention is to provide a new fishing rod support apparatus which provides in the apparatuses and methods of the prior art some of the advantages thereof, while simultaneously overcoming some of the disadvantages normally associated therewith.

Still another object of the present invention is to provide a new fishing rod support apparatus for supporting and pivotally adjusting a fishing pole.

Yet another object of the present invention is to provide a new fishing rod support apparatus which includes a shaft that has a pair of ends and a stand assembly for supporting the shaft above a surface. The stand assembly preferably comprises an annular collar that is removably mounted about a peripheral wall of the shaft. A plurality of leg members each having a first end and a second end is coupled to an outer surface of the annular collar. A tubular member for selectively receiving a handle of a fishing pole is coupled to the first end of the shaft.

Still yet another object of the present invention is to provide a new fishing rod support apparatus that, that unlike the prior art that employs spikes as legs requiring insertion into a surface to be used, is fully adjustable and portable and can be used in boats, and on uneven terrain without having to secure the new apparatus to a surface.

Even still another object of the present invention is to provide a new fishing rod support apparatus that provides an individual freedom to handle other tasks at hand, such as monitoring accompanied children fishing without having to worry about their fishing pole being dragged into the water.

These together with other objects of the invention, along with the various features of novelty which characterize the invention, are pointed out with particularity in the claims annexed to and. forming a part of this disclosure. For a better understanding of the invention, its operating advantages and the specific objects attained by its uses, reference should bee made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a schematic partial exploded view of the present invention showing a tubular member and a shaft.

FIG. 3 is a schematic perspective view of the present invention showing a coupling member coupling the tubular member to a first portion of the shaft.

DESCRIPTION OF THE PREFERRED EMBODIMENT

Figure 1:
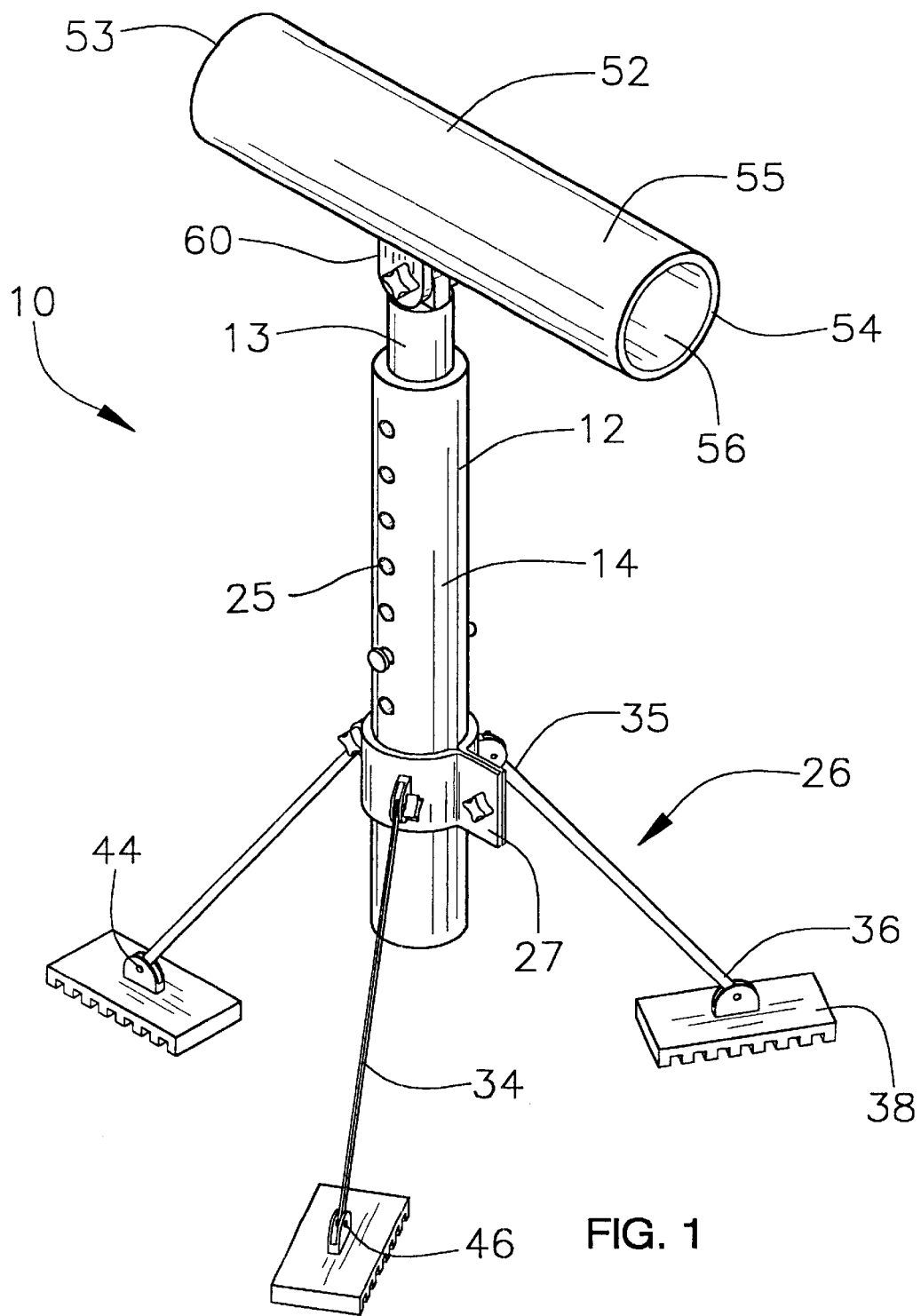
FIG. 1 is a schematic perspective view of a new fishing rod support apparatus according to the present invention.
Figure 4:
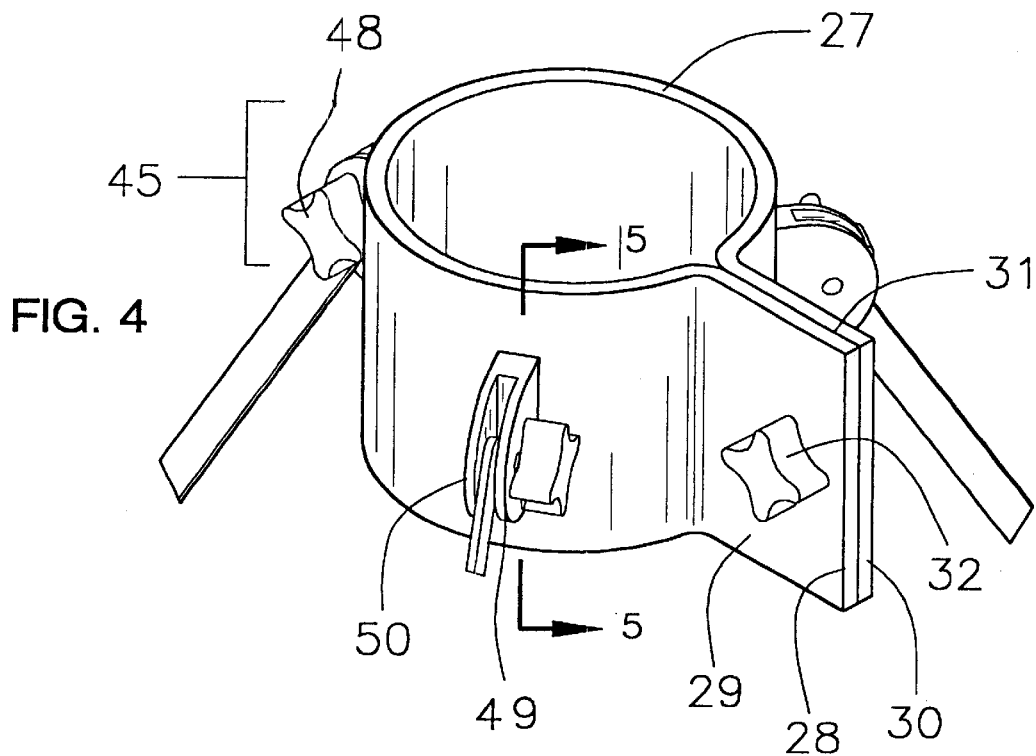
FIG. 4 is a schematic perspective view of the present invention showing an annular collar having a plurality of leg members attached thereto.
Figure 5:
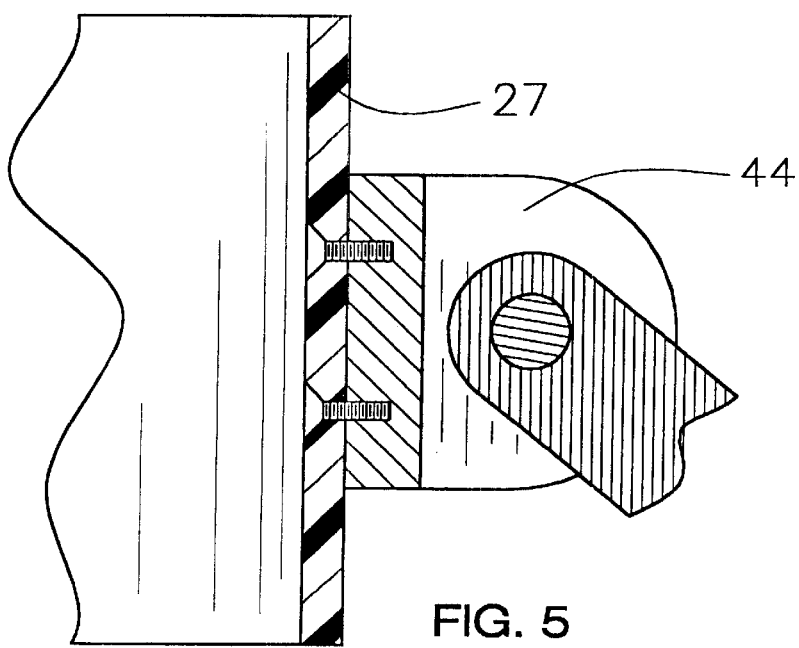
FIG. 5 is a schematic cross-sectional view of the present invention taken along line 5—5 of FIG. 4 showing a spaced ear member coupling one of the leg members to t he annular collar.
Figure 6:
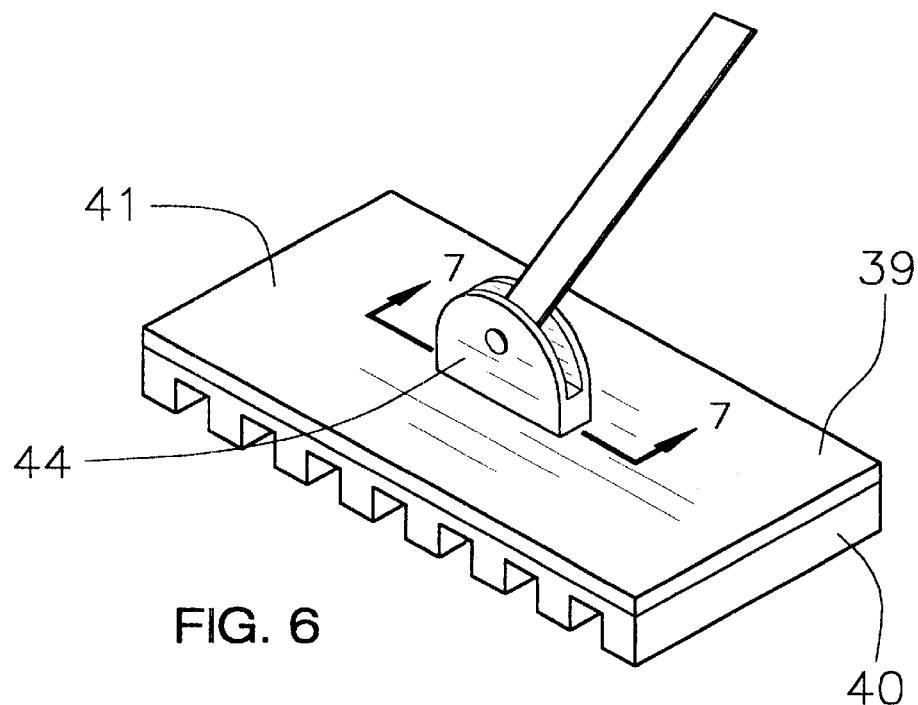
FIG. 6 is a schematic perspective view of the present invention showing a, foot member coupled to one of the leg members.
Figure 7:
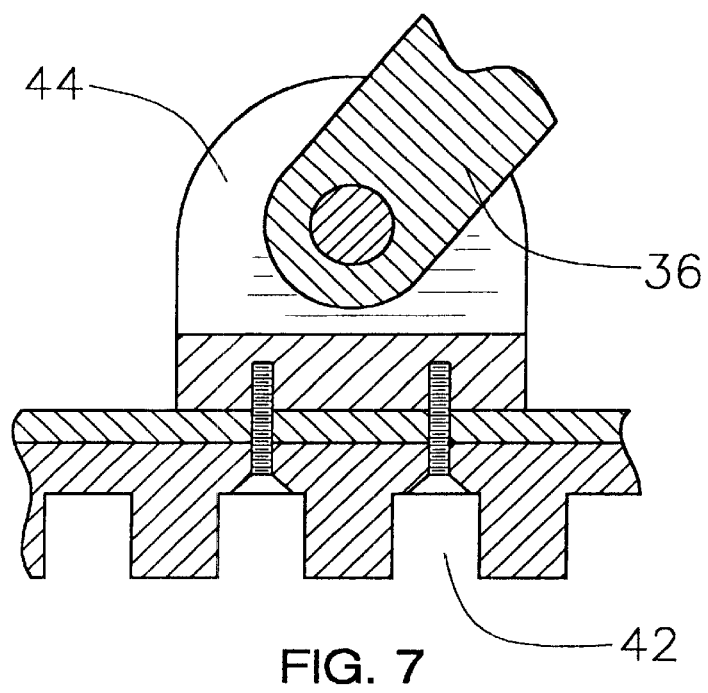
FIG. 7 is a schematic cross-sectional view of the present invention taken along line 7—7 of FIG. 6 showing a spaced ear member coupling a second end of one of the leg members to the foot member.

With reference now to the drawings, and in particular to FIGS. 1 through 7 thereof, a new fishing rod support apparatus embodying the principles and concepts of the present invention and generally designated by the reference numeral 10 will be described.

As best illustrated in FIGS. 1 through 7, the fishing rod support apparatus 10 generally comprises a shaft 12 that may include a first portion 13 and a second portion 14 with the first 13 and second 14 portions preferably telescoping between an extended position and a retracted. In one embodiment of the present invention, the second portion 14 has a first end 15, a second end 16 and a peripheral wall 17 extending between the first 15 and second 16 ends. The first end 15 of the second portion 14 includes a cavity 18 extending therein toward the second end 16.

In one embodiment of the present invention, the first portion 13 has a first end 20, a second end 21 and a perimeter wall 22 extending between the first 20 and second 21 ends of the first portion 13. The second end 21 of the first portion 13 is telescopically extendible in the cavity 18 of the second portion 14. Alternatively, the first portion 13 may comprise a substantially solid cylindrical member having a pair of ends.

As particularly illustrated in FIG. 2, a securing member 24 may be provided for securing a position of the first portion 13 with respect to the second portion 14. The securing member 24 is removably insertable through one of a plurality of holes 25 extending through the peripheral wall 17 of the second portion 14 and extending into the perimeter wall 22 of the first portion 13. The securing member 24 may comprise a cotter pin.

As illustrated in FIG. 1, a stand assembly 26 is provided for holding the shaft 12 above a surface. The stand assembly 26 preferably comprises an annular collar 27 that is removably mounted about the peripheral wall 17 of the second portion 14. As particularly illustrated in FIG. 4, a first end 28 of the annular collar includes a first tab 29 formed thereon and a second end 30 of the annular collar includes a second tab 31 formed thereon. The first tab 29 is positioned generally adjacent to the second tab 31 such that each of the tabs 29 and 31 are selectively abutting each other.

A first fastening member 32 maybe provided for fastening the first tab 29 to the second tab 31 in order to secure the annular collar 27 to the shaft 12. The first fastening member 32 extends through the first tab 29 and into the second tab 31. The first fastening member 32 may comprise a fastener such as, for example, a screw.

The stand assembly 26 also includes a plurality of leg members 34 that are elongated and include a first end 35 and a second end 36. The first end 35 of each of the leg members 34 maybe pivotally coupled to an outer surface of the annular collar 27. Each of the leg members 34 is preferably positionable between a folded position and an extended position. In one embodiment of the present invention, the folded position is characterized when a longitudinal axis of each of the leg members 34 is orientated generally parallel to a longitudinal axis of the shaft 12. The extended position is characterized when the longitudinal axis of each of the leg members 34 intersects the longitudinal axis of the shaft 12. Each of the leg members 34 may comprise a substantially rigid material such as, for example, a plastic, wood or metal material.

As illustrated in FIG. 1, a plurality of foot members 38 maybe provided for resisting slippage of each of the leg members 34 in relation to the surface that the leg members 34 are resting upon. As particularly illustrated in FIGS. 6 and 7, each of the foot members 38 preferably includes an upper portion 39 and a lower portion 40. In one embodiment of the present invention, a first side 41 of the upper portion 39 is pivotally coupled to the second end 36 of a respective leg member 34. The upper portion 39 may comprise a substantially rigid material such as, for example, a plastic, wood or metal material. The lower portion 40 may comprise a generally flexible material such as, for example, a rubber material.

The lower portion 40 may have a plurality of channels 42 extending into a surface of the lower portion 40 for griping the surface, such as sand, or dirt, that each of the foot members 38 are resting upon. Each of the channels 42 is positioned generally adjacent to each other such that a row of channels 42 is defined.

As illustrated in FIG. 1, a plurality of spaced ear members 44 may be provided for pivotally coupling the first end 35 of each of the leg members 34 to the annular collar 27 and for coupling each of the foot members 38 to the second end 36 of each of the leg members 34. As particularly illustrated in FIG. 4, a first set 45 of the spaced ear members 44 is removably coupled to and extending away from the outer surface of the annular collar 27. As particularly illustrated in FIG. 6, a second set 46 of the spaced ear members 44 is coupled to and extending away from the first side 41 of the upper portion 39 of each of the foot members 38. The first end 35 of the each of the leg members 34 is positioned between and pivotally coupled to the first set of spaced ear members 44. The second end 36 of each of the leg members 34 are positioned between and pivotally couple to the second set of spaced ear members 44.

A plurality of second fastening members 48 may be provided for pivotally fastening each of the leg members 34 in the extended position with respect to the shaft 12. Each of the second fastening members 48 preferably extend through a first spaced ear 49 of each of the spaced ear members 44 and through the first end 35 of a respective leg member 34 and into a second spaced ear 50 of each of the spaced ear members 44.

As illustrated in FIGS. 1, 2 and 3, a tubular member 52 is provided for selectively receiving the handle of the fishing pole. The tubular member 52 is preferably pivotally coupled to the first end 20 of the first portion 13. The tubular member 52 includes a first end 53, a second end 54 and a peripheral wall 55 extending between the first 53 and second ends 54 of the tubular member 52. The first end 53 of the tubular member 52 includes a channel 56 extending therein and through the second end 54 of the tubular member 52. The tubular member 52 may comprise a substantially rigid material such as, for example, a plastic, wood or metal material.

As illustrated in FIGS. 1, 2 and 3, a coupling, member 60 maybe provided for pivotally coupling the tubular member 52 to the first end 20 of the first portion 13. The coupling member 60 preferably includes-a male portion 62 that is pivotally insertable into and coupled to a female portion 63. In one embodiment, the male portion 62 comprises a tab 64 that is mounted on and extending away from the first end 20 of the first portion 13. The female portion 63 comprises a pair of spaced protruding members 65 that are mounted on and extending away from the peripheral wall 55 of the tubular member 52. The pair of protruding members 65 is preferably positioned a generally equal distance between the first 53 and second 54 ends of the tubular member 52.

A third fastening member 66 may be provided for fastening the tubular member 52 in a fixed position with respect to the shaft 12. The third fastening member 66 preferably extends through a first protruding member 67 of the pair of protruding members 65 and through the male portion 62 and into a second protruding member 68 of the pair of protruding members 65.

In use, the user sets the first portion 13 to a desired extended position with respect to the second portion 14 of the shaft. The user pivots the tubular member 52 to a desired angle with respect to the shaft 12. The user then inserts the handle of the fishing pole into the channel 56 extending through the tubular member 52 in order to support the fishing pole.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishing rod support apparatus for supporting a fishing rod above a surface, the fishing rod having a handle, said apparatus comprising:

a shaft having a pair of ends;

a stand assembly for supporting said shaft above a support surface, said stand assembly comprising:

an annular collar being removably mounted about said shaft;

a plurality of leg members each having a first end and a second end, said first end of each of said leg members being coupled to said annular collar;

a plurality of elongate foot members for restricting each of said leg members from moving in relation to the support surface, an upper portion of each of said foot members being pivotally coupled to said second end of a respective leg member for the purpose of adjusting to a terrain of the support surface, each of said foot members being oriented with respect to said shaft such that a central longitudinal axis of each of said foot members intersects a central longitudinal axis of said shaft;

wherein a lower portion of each of said foot members has a plurality of channels extending therein, each of said channels being oriented substantially perpendicular to the longitudinal axis of each of said foot members, each of said channels having a generally square cross section such that said lower portion of each of said foot members comprises a plurality of rectangular sections each having corner edges for the purpose of increasing frictional resistance on the support surface; and a tubular member for selectively receiving the handle of the fishing rod, said tubular member being coupled to said first end of said shaft.

2. The fishing rod support apparatus of claim 1, wherein said shaft includes a first portion and a second portion, said first and second portions telescoping between an extended position and a retracted position, wherein said second portion has a first end, a second end and a peripheral wall extending between said first and second ends, said first end of said second portion having a cavity extending therein toward said second end, wherein said first portion has a first end and a second end which is telescopically extendible in said cavity of said second portion, said annular collar being mounted on said peripheral wall of said second portion.

3. The fishing rod support apparatus of claim 2, additionally including:
a securing member for securing a position of said first portion with respect to said second portion, said securing member being removably insertable through one of a plurality of holes extending through said peripheral wall of said second portion and extendable into said first portion.

4. The fishing rod support apparatus of claim 2, wherein said tubular member is pivotally coupled to said first end of said first portion of said shaft, said tubular member having a first end, a second end and a peripheral wall extending between said first and second ends, said first end of said tubular member having a channel extending therein and through said second end of said tubular member, wherein the handle of the fishing pole is removably insertable in said channel.

5. The fishing rod support apparatus of claim 4, additionally including:
a coupling assembly for pivotally coupling said tubular member to said shaft, said coupling assembly comprising a male portion of said shaft being pivotally couplable to a female portion of said tubular member.

6. The fishing rod support apparatus of claim 5, wherein said male portion comprises a tab that is mounted on and extends away from said first end of said first portion of said shaft, wherein said female portion comprises a pair of spaced protruding members that are mounted on and extend away from said peripheral wall of said tubular member.

7. The fishing rod support apparatus of claim 6, additionally including:
a fastening member for fastening said tubular member in a fixed position with respect to said shaft, said fastening member extending through a first protruding member of said pair of protruding members and through said male portion and into a second protruding member of said pair of protruding members.

8. The fishing rod support apparatus of claim 1, wherein said annular collar has a first tab and a second tab formed thereon, each of said tabs being positioned generally adjacent to each other such that each of said tabs are selectively abuttable to each other, a first fastening member for fastening said first tab to said second tab extends through said first tab and into said second tab.

9. The fishing rod support apparatus of claim 1, wherein each of said leg members is pivotally positionable between a folded position and an extended position, wherein said folded position is characterized when a longitudinal axis of each of said leg members is orientated generally parallel to said longitudinal axis of said shaft, said extended position being characterized when said longitudinal axis of each of said leg members intersects said longitudinal ax is of said shaft.

10. The fishing rod support apparatus of claim 9, additionally including:
a plurality of spaced ear members for pivotally coupling said first end of each of said leg members to said annular collar and for coupling each of said foot members to said second end of said leg members.

11. The fishing rod support apparatus of claim 8, wherein said plurality of spaced ear members additionally includes a first set of spaced ear members being removably coupled to and extending away from an outer surface of said annular collar and said first end of each of said leg members being positioned between and pivotally coupled to said first set of said spaced ear members coupled to said annular collar.

12. The fishing rod support apparatus of claim 11, additionally including:
a plurality of fastening members for pivotally fastening each of said leg members in said extended position, each of said fastening members extending through a first spaced ear of each of said first set of said spaced ear members and through said first end of one of said leg members and into a second spaced ear of each of said first set of said spaced ear members.

13. The fishing rod support apparatus of claim 8, wherein said plurality of spaced ear members additionally includes a second set of spaced ear members being coupled to and extending from a first side of said upper portion of each of said foot members, said second end of each of said leg members being positioned between and pivotally coupled to each said second set of said spaced car members coupled to each of said foot members.

14. A fishing rod support apparatus for supporting a fishing rod above a surface, the fishing rod having a handle, said apparatus comprising:
a shaft having a first portion and a second portion, said first and second portions telescoping between an extended position and a retracted position;
wherein said second portion has a first end, a second end and a peripheral wall extending between said first and second ends, said first end of said second portion having a cavity extending therein toward said second end;
wherein said first portion has a first end, a second end and a perimeter wall extending between said first and second ends of said first portion, said second end of said first portion being telescopically extendible in said cavity of said second portion;
a securing member for securing a position of said first portion with respect to said second portion, said securing member being removably insertable through one of a plurality of holes extending through said peripheral wall of said second portion and extendable into said perimeter wall of said first portion;
a stand assembly for holding said shaft above a surface, said stand assembly comprising:
an annular collar being removably mounted about the peripheral wall of said second portion, a first end of said annular collar having a first tab formed thereon, a second end of said annular collar having a second tab formed thereon, said first tab being positioned generally adjacent to said second tab such that each of said tabs are selectively abutting each other;
a first fastening member for fastening said first tab to said second tab, said first fastening member extending through said first tab and into said second tab;
a plurality of leg members being elongated and each having a first end and a second end, said first end of each of said leg members being pivotally coupled to an outer surface of said annular collar and positionable between a folded position and an extended position, wherein said folded position is characterized when a longitudinal axis of each of said leg members is orientated generally parallel to a longitudinal axis of said shaft, said extended position being characterized when said longitudinal axis of each of said leg members intersects said longitudinal axis of said shaft;

a plurality of foot members for preventing each of said leg members from slipping in relation to the surface, each of said foot members having an upper portion and a lower portion;
   wherein a side of each of said upper portions is pivotally coupled to said second end of each of said leg members, each of said upper portions comprising a substantially rigid material;
   wherein each of said lower portions has a plurality of channels extending into a surface of said lower portion, each of said channels being positioned generally adjacent to each other;
a plurality of spaced ear members comprising a first set of spaced ear members for pivotally coupling said first end of each of said leg members to said annular collar and a second set of said spaced ear members for coupling each of said foot members to said second end of each of said leg members;
   wherein each of said first set of said spaced ear members is removably coupled to and extending away from an outer surface of said annular collar, said first end of each of said leg members being positioned between and pivotally coupled to each of said first set of spaced ear members;
   wherein each of said second set of said spaced ear members is coupled to and extending away from said side of said upper portion of each, of said foot members, said second end of each of said leg members being positioned between and pivotally coupled to each of said second set of spaced ear members;
a plurality of second fastening members for pivotally fastening each of said leg members in said extended position, each of said second fastening members extending through a first spaced ear of each of said first set of spaced ear members and through said first end of one of said leg members and into a second spaced ear of each of said first set of spaced ear members;
a tubular member for selectively receiving the handle of the fishing pole, said tubular member being pivotally coupled to said first end of said first portion, said tubular member having a first end, a second end and a peripheral wall extending between said first and second ends of said tubular member, said first end of said tubular member having a channel extending therein and through said second end of said tubular member, said tubular member comprising a substantially rigid material;
a coupling member for pivotally coupling said tubular member to said first end of said first portion, said coupling member having a male portion being pivotally insertable into and coupled to a female portion;
   wherein said male portion comprises a tab being mounted on and extending away from said first end of said first portion;
   wherein said female portion comprises a pair of spaced protruding members being mounted on and extending away from said peripheral wall of said tubular member, said pair of protruding members being positioned a generally equal distance between said first and second ends of said tubular member; and
a third fastening member for fastening said tubular member in a fixed position with respect to said shaft, said third fastening member extending through a first protruding member of said pair of protruding members and through said male portion and into a second protruding member of said pair of protruding members.

\* \* \* \* \*